US009376117B1

(12) United States Patent
Parundekar et al.

(10) Patent No.: US 9,376,117 B1
(45) Date of Patent: Jun. 28, 2016

(54) DRIVER FAMILIARITY ADAPTED EXPLANATIONS FOR PROACTIVE AUTOMATED VEHICLE OPERATIONS

(71) Applicant: TOYOTA JIDOSHA KABUSHIKI KAISHA, Toyota-shi, Aichi-ken (JP)

(72) Inventors: Rahul Parundekar, Sunnyvale, CA (US); John Mark Agosta, Palo Alto, CA (US)

(*) Notice: Subject to any disclaimer, the term of this patent is extended or adjusted under 35 U.S.C. 154(b) by 0 days.

(21) Appl. No.: 14/665,598

(22) Filed: Mar. 23, 2015

(51) Int. Cl.
*B60W 50/08* (2012.01)
*B60W 40/09* (2012.01)

(52) U.S. Cl.
CPC ............ *B60W 40/09* (2013.01); *B60W 50/08* (2013.01)

(58) Field of Classification Search
USPC .......................................... 434/64–66; 701/1
See application file for complete search history.

(56) References Cited

U.S. PATENT DOCUMENTS

| 4,275,292 | A | * | 6/1981 | Corbi ................ G01B 11/02 340/942 |
| 5,015,189 | A | * | 5/1991 | Wenzinger, Jr. ....... G09B 9/048 348/121 |
| 5,408,587 | A | | 4/1995 | Maier et al. |
| 6,631,361 | B1 | | 10/2003 | O'Flaherty et al. |
| 7,346,409 | B2 | | 3/2008 | Nakajima et al. |
| 8,423,362 | B2 | | 4/2013 | Chengalvarayan et al. |
| 2012/0174111 | A1 | * | 7/2012 | Pala ..................... G06F 3/011 718/102 |
| 2013/0052614 | A1 | * | 2/2013 | Mollicone ............ G09B 19/167 434/65 |
| 2015/0006457 | A1 | | 1/2015 | Lambert et al. |
| 2015/0262484 | A1 | * | 9/2015 | Victor .................. G09B 19/16 701/1 |

FOREIGN PATENT DOCUMENTS

JP         2009121960 A    6/2009
WO         03083794 A1    10/2003

* cited by examiner

*Primary Examiner* — Yonel Beaulieu
(74) *Attorney, Agent, or Firm* — Burbage Law, P.C.; Jon Burbage; Elizabeth Ruzich

(57) ABSTRACT

The disclosure includes a system, method and tangible memory for providing a driver familiarity adapted explanation to a driver of a vehicle. The system includes a sensor set configured to measure sensor data describing a task and the driver. The system also includes an onboard vehicle computer including a tangible memory, a processor, a task tracker and a familiarity application. The task tracker causes the processor to determine a vehicle operation to be proactively performed by the task tracker to autocomplete the task. The familiarity application causes the processor to execute steps including estimating how familiar the driver is with the vehicle operation based on the sensor data describing the driver of the vehicle, retrieving a template explanation associated with the vehicle operation, and adapting the template explanation to generate a driver familiarity adapted explanation describing the autocomplete of the vehicle operation.

20 Claims, 6 Drawing Sheets

DRIVER FAMILIARITY ADAPTED EXPLANATIONS FOR PROACTIVE AUTOMATED VEHICLE OPERATIONS

CROSS REFERENCE TO RELATED APPLICATIONS

This application is related to U.S. patent application Ser. No. 14/665,685, filed Mar. 23, 2015 and titled "Proactive Autocomplete of a User's In-Vehicle Operations," the entirety of which is herein incorporated by reference.

BACKGROUND

The specification relates to driver familiarity adapted explanations for proactive automated vehicle operations.

Drivers have many vehicle tasks that may need to be completed when they are in their vehicles. For example, a driver may need to turn on their windshield wipers and headlights when it begins to rain. This particular task includes two vehicle operations: (1) turning on the windshield wipers; and (2) turning on the headlights. These and similar vehicle operations may be a distraction to the driver, thereby posing a safety risk or otherwise decreasing the quality of the driving experience for the driver.

SUMMARY

The subject matter described in this disclosure includes a task tracker and a familiarity application. The task tracker and the familiarity application may be included in an embedded system of a vehicle. An onboard computer of the vehicle may include one or more electronic devices that are configured to store and execute one or more of the task tracker and the familiarity application. One or more of the task tracker and the familiarity application may be stored in a tangible memory of the onboard computer and executed by a processor of the onboard computer. One or more of the task tracker and the familiarity application may be communicatively coupled to a network for bidirectional wireless communication with one or more servers.

The task tracker may solve the problem of drivers having to complete vehicle operations in their vehicles (as used herein, the term "driver" refers to any occupant of a vehicle unless otherwise noted). Each vehicle operation may include one or more tasks (as used herein, the term "task" refers to an "in-vehicle task" unless otherwise noted). The task tracker may solve this problem by monitoring and analyzing a driver's in-vehicle habits to determine tasks that are habitually performed together to complete a vehicle operation. The task tracker may build a dataset that describes these tasks and their constituent vehicle operations. The task tracker may monitor which tasks a driver is performing in their vehicle. The task tracker may identify the performance as associated with a vehicle operation. The task tracker may determine which tasks need to be completed to proactively autocomplete the vehicle operation for the driver. The task tracker may proactively autocomplete these tasks for the user so that the vehicle operation is completed. This process may require no input or requests from the driver.

The task tracker may include a digitally stored table describing a sequence of tasks that are typically or habitually performed as a group by the driver in order to complete a vehicle operation. For example, assume that the vehicle operation is "prepare vehicle for driving in the rain." This vehicle operation may have two tasks that need to be performed in order for the vehicle operation to be complete: (1) the windshield wipers are turned on; and (2) the headlights are turned on. In-vehicle sensors monitor and track the driver's activities to determine whether the driver has begun the vehicle operation of "preparing vehicle for driving in the rain." When the sensors detect that the driver has turned on the windshield wipers (or looking at the control element for the windshield wipers, or beginning to reach for the control element associated with the windshield wipers, or touching the control element associated with the windshield wipers), the task tracker proactively turns on the headlights in an automated fashion, thereby autocompleting the task of "preparing vehicle for driving in the rain."

The task tracker may proactively autocomplete tasks in response to events other than the driver's actions. For example, the task tracker may detect that it is raining outside, and then proactively turn the windshield wipers on and headlights on to perform the vehicle operation of preparing the vehicle for rainy conditions. The task tracker may include a control element such as a dial or knob that is used to turn on the task tracker or dial in the level of proactivity.

The digitally stored table may be described by a digitally stored dataset. The digitally stored table may describe a variety of in-vehicle tasks. The digitally stored table may describe a countable sequence of vehicle operations that are performed as a group in order to complete a task. The digitally stored table may describe one or more different tasks and the vehicle operations that need to be performed to complete each vehicle operation.

In some implementations, the task tracker may proactively autocomplete a vehicle operation so that the vehicle operation is complete without regard to completing a task. In other words, in some implementations the task tracker identifies or estimates that the driver is about to perform a vehicle operation and the task tracker completes this vehicle operation for the driver even if the vehicle operation itself is not an element of a task which may include multiple vehicle operations.

The occurrence of the task tracker completing tasks and vehicle operations may frighten, distract or otherwise cause concern for the driver. The familiarity application solves this problem by providing an explanation to the driver about the one or more tasks or vehicle operations being performed by the task tracker.

The familiarity application may provide a human understandable explanation of the proactive automated vehicle operations that the task tracker performs to assist the driver. The familiarity application may generate explanations that are specific to the driver's familiarity with the vehicle operations.

The familiarity application may reduce repetitive explanations by adapting the explanations generated for the driver familiarity. The familiarity application may estimate and store familiarity data describing an estimate of the driver's familiarity with different vehicle operations. The familiarity application may modify explanations for subsequent performance of a vehicle operation by the task tracker based on the familiarity data describing the driver's estimated familiarity with that particular vehicle operation. In this way, the familiarity application may avoid giving redundant explanations for vehicle operations when the driver is estimated to be familiar with the task tracker's performance of the vehicle operation. Furthermore, in this way the familiarity application also provides an explanation of the vehicle operation in a detail proportionate to the estimate of how familiar the driver is with the vehicle operation.

For example, the task tracker may proactively turn the vehicle headlights on without user input when the driver turns the windshield wipers on since this is either the driver's habit or a legal requirement in the local jurisdiction (e.g., in California, driving laws require vehicle headlights to be on when windshield wipers are on). If the driver is estimated to be unfamiliar with the task tracker proactively turning the vehicle headlights on, then an explanation of the task tracker's performance of this vehicle operation may be presented to the driver. In other cases the task tracker's performance of a vehicle operation may be based on combinations of sensor data unrelated to driver action. For both cases, the familiarity application may present an explanation to the driver if the familiarity data indicates that the driver is unfamiliar with the task tracker's performance of the vehicle operation.

According to one innovative aspect of the subject matter described in this disclosure, an onboard familiarity system of a vehicle may provide a driver familiarity adapted explanation to a driver of the vehicle. The familiarity system includes a sensor set configured to measure sensor data describing a task and the driver. The familiarity system also includes an onboard vehicle computer including a tangible memory, a processor, a task tracker and a familiarity application. The task tracker and the familiarity application are stored in the tangible memory which is communicatively coupled to the processor.

The task tracker, responsive to being executed by the processor, causes the processor to determine, based on the sensor data describing the task, a vehicle operation to be proactively performed by the task tracker to autocomplete the task for the driver of the vehicle.

The familiarity application, responsive to being executed by the processor, causes the processor to execute steps. The steps include one or more of the following: estimating how familiar the driver is with the vehicle operation based on the sensor data describing the driver of the vehicle; retrieving a template explanation associated with vehicle operation; adapting the template explanation, based on the estimate of how familiar the driver is with the vehicle operation, to generate a driver familiarity adapted explanation describing the autocomplete of the vehicle operation in a detail proportionate to the estimate; and providing the driver familiarity adapted explanation to the driver of the vehicle.

Other aspects may include corresponding methods, apparatus, and computer program products.

The familiarity application described herein provides numerous benefits not present in prior solutions. In one example benefit, the familiarity application may estimate the driver's familiarity with a given vehicle operation based on parameter data describing a vehicle state at the time that the vehicle operation was last performed. For example, assume the task is "lowering a window to release hot air from the vehicle cabin" and the vehicle operation is lowering a vehicle window. The parameter data may describe the window level during the explanation of the vehicle operation to the driver.

In another example benefit, the familiarity application includes sensor data to initially create and subsequently modify familiarity data describing the estimate of the driver's familiarity with different vehicle operations.

In one example benefit, the familiarity application may use different explanation templates for explaining the same vehicle operation. Using different explanation templates for the same vehicle operation beneficially provides variations that more closely approximate how humans tend to explain things to one another, and so, this approach is more natural and understandable to the driver of the vehicle.

In another example benefit, the familiarity application may cause a speaker device of the vehicle to reproduce a sound to indicate that the driver is estimated to be familiar with a vehicle operation, and so, no explanation of the vehicle operation is needed.

In one example benefit, the familiarity application may include a spoken dialog system for communicating with the driver. The familiarity application may provide the explanation of the vehicle operation using the spoken dialog system. The driver may provide input to the familiarity application via the spoken dialog system. For example, the driver may override the familiarity estimate determined by the familiarity application via speech input to the spoken dialog system. The spoken dialog system may be configured to receive and process instructions from the driver using a natural language.

In another example benefit, the familiarity application may not use occurrence counts in estimating driver familiarity with a vehicle operation. Instead, the familiarity application may use a numeric value (e.g., prior probability based on a typical driver) for estimating the driver's familiarity with the vehicle operation.

In another example benefit, the familiarity application may include functionality to determine the identity of different drivers and modify the driver familiarity estimates based on the identity of the different drivers. In this way, multiple drivers may use the vehicle and still receive a personalized experience based on their personal level of familiarity with different vehicle operations.

In another example benefit, the familiarity application may include functionality to propose a vehicle operation to the driver. For example, for a new vehicle, the familiarity application may provide an audio prompt to the driver of the vehicle indicating that they should consider performing some vehicle operation such as filling their fuel tank with a particular type of fuel. Later, as the driver becomes more familiar with the vehicle, the familiarity application may not specify the type of fuel while still providing some amount of explanation of the proposed vehicle operation. As the driver gets even more familiar with the vehicle, the familiarity application may not provide any explanation to the driver regarding this vehicle operation. In this way, the familiarity application adapts to the needs of the driver based on the driver's familiarity with the vehicle and the operations of the vehicle.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
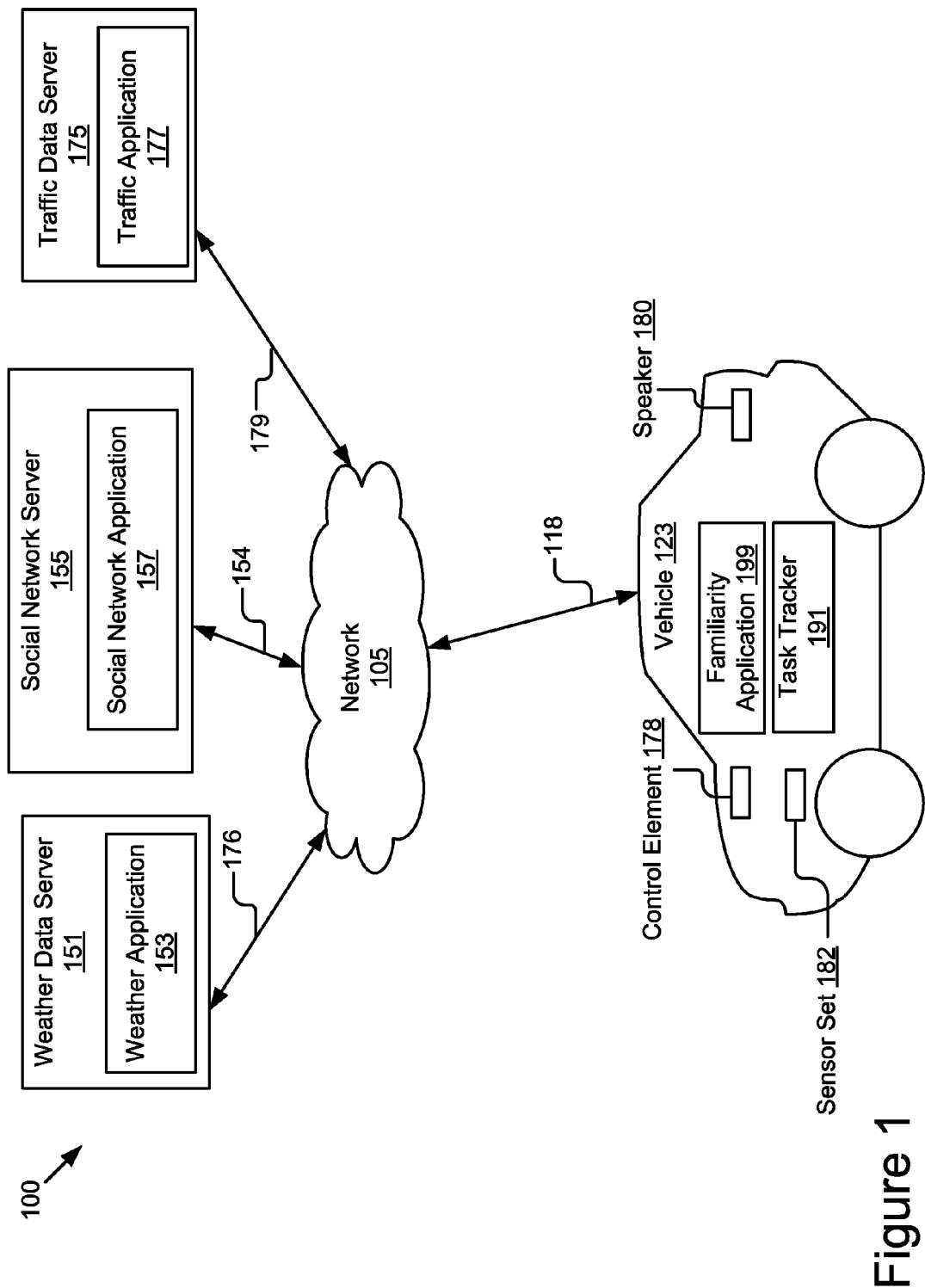
FIG. 1 is a block diagram illustrating an example system for providing driver familiarity adapted explanations for proactive automated vehicle operations.

The task tracker and the familiarity application may be included in an embedded system of a vehicle. An onboard computer of the vehicle may include one or more electronic devices that are configured to store and execute one or more of the task tracker and the familiarity application. One or more of the task tracker and the familiarity application may be stored in a tangible memory of the onboard computer and executed by a processor of the onboard computer. One or more of the task tracker and the familiarity application may be communicatively coupled to a network for bidirectional wireless communication with one or more servers.

The task tracker may include a memory and a processor device. The processor device may be programmed to perform one or more steps of a method 300 described below with reference to FIGS. 3A-3C. One or more example implementations of the task tracker will be described below.

The task tracker may monitor vehicle sensors for sensor data. The sensors may include in-vehicle sensors that detect an initial vehicle operation performed by a driver. For example, the windshield wipers may detect that the driver initiated operation of the windshield wipers. In another example, the sensors may include in-vehicle cameras and the sensor data may include images captured by the in-vehicle cameras. In yet another example, the sensors may include a communication unit that receives wireless updates of weather data or traffic data from a network, for example, from the Internet.

In some implementations, the task tracker determines an occurrence of an initial vehicle operation performed by a driver based on the sensor data. For example, the initial vehicle operation may include that the driver turned on the windshield wipers. The task tracker determines a vehicle task from a digitally stored dataset based on the initial vehicle operation. For example, the task tracker may determine that turning on the windshield wipers is a first operation from a sequence of vehicle operations for the vehicle task of "preparing a vehicle for driving in the rain." This vehicle task may include one or more vehicle operations. The task tracker determines a next vehicle operation to autocomplete based on the vehicle task. For example, the task tracker may determine that the next vehicle operation for preparing the vehicle for driving in the rain is to turn on the headlights. The task tracker instructs hardware associated with the vehicle to perform the next vehicle operation.

Once the task tracker has determined a next vehicle operation to autocomplete based on the vehicle task, the task tracker autocompletes the next vehicle operation. The task tracker determines if the vehicle task is complete. If the vehicle task is not complete, the task tracker may determine the next vehicle operation to autocomplete and repeat the steps of autocompleting the next vehicle operation and determining whether the vehicle task is complete until the vehicle task is complete. For example, the task tracker may determine that the initial vehicle operation is that the driver turned on the windshield wipers, the vehicle task is to prepare the vehicle for driving in the rain, and the next vehicle operation is to turn on the headlights. The task tracker may turn on the headlights and determine whether the vehicle task is complete. The task tracker may determine that the vehicle task is not complete because the digitally stored dataset includes an instruction to turn on the back windshield wipers. The task tracker may turn on the back windshield wipers and determine that the vehicle task is complete.

The familiarity application may be an element of a familiarity system. The familiarity system may include a memory and a processor device. The processor device may be programmed to perform one or more steps of a method 300 described below with reference to FIGS. 3A-3C. One or more example implementations of the familiarity application will be described below.

In some implementations, the familiarity application estimates, substantially contemporaneous to the task tracker's performance of a proactive automated vehicle operation, the driver's familiarity with that vehicle operation and presents an explanation to the driver. For example, if the task tracker proactively autocompletes a vehicle operation for the driver, then the familiarity application may (1) estimate whether the driver is familiar with the vehicle operation and (2) present an explanation of the vehicle operation to the driver. If the driver is estimated to be familiar with the vehicle operation, then the familiarity application may not present an explanation of the vehicle operation to the driver or may present an explanation to the driver that includes less detail based on an estimate of how familiar the driver is with the vehicle operation.

The familiarity application may estimate the driver's familiarity with a vehicle operation the first time that operation is performed by the task tracker. For example, the familiarity application may establish a familiarity estimate the first time that a proactive automated vehicle operation occurs and upon every subsequent occurrence of that same proactive automated vehicle operation.

In some implementations, the first time a vehicle operation is performed by the task tracker, a predefined table of familiarity estimates for different automated proactive vehicle operations (i.e., a "familiarity estimate table") may be used to determine familiarity data describing an estimate of the driver's familiarity with the particular vehicle operation.

In some implementations, the familiarity estimate table may describe one or more of the following: (1) one or more tasks that may be performed by the task tracker; (2) the vehicle operations that are included in each task; (3) an estimate of how familiar the driver is with each of the one or more vehicle operations (including an initial estimate of the driver's familiarity with the vehicle operation when the vehicle operation is first performed); and (4) an estimate, for each vehicle operation included in the table, of the degree of detail that should be included in the explanation provided by the familiarity application.

The familiarity estimate table may be used to estimate the driver's initial familiarity with a given vehicle operation. For example, assume that a task includes "turning on the vehicle's hazard lights when the tire is flat or vehicle is out of fuel." Further assume that this is the first time that this task has been performed for the driver, or that the driver has never used the hazard lights included in their vehicle (which, in this example, is a vehicle operation included in the task). Since this is the first time that this vehicle operation has been performed for the driver, the familiarity estimate table may include familiarity data indicating that the driver is not familiar with the vehicle operation of turning on the vehicle's hazard lights. Moreover, since research and experience shows that typical drivers infrequently use their hazard lights, the familiarity estimate table may include data indicating that the explanation provided by the familiarity application in the first instance of the task tracker performing this vehicle operation may include more detail than explanations for other vehicle operations which are estimated to be more familiar to the driver.

By comparison, assume instead that the task listed in the familiarity estimate table includes "turning the headlights on when the vehicle is in a dark environment." In this case, since research and experience indicates that typical drivers frequently use their vehicle headlights, the familiarity estimate table may include familiarity data indicating that the driver is estimated to be familiar with the vehicle operation of turning on the vehicle headlights regardless of whether the driver has not used this vehicle operation in this particular vehicle. Accordingly, the familiarity estimate table may also include data indicating that the familiarity application does not need to provide the driver with an explanation of this vehicle operation or, alternatively, that any explanation provided may include less detail than explanations for other vehicle operations which are estimated to be less familiar to the driver.

In another embodiment, the first estimate of driver familiarity may be established and tracked based on sensor data describing sensor observations of the driver. For example, the sensors may include one or more in-vehicle cameras and microphones to monitor the driver's whether the driver is familiar with the task tracker's proactive performance of a vehicle operation.

The familiarity application provides numerous example benefits. For example, the familiarity application may modify or update the familiarity data based on one or more of the following factors: (1) sensor data indicating the driver's familiarity with a given vehicle operation; (2) history data describing the number of instances in which the driver has been present for the task tracker performing a given vehicle operation; and (3) driver input (express or implied) indicating the driver's familiarity with the task tracker performing a given vehicle operation.

In some implementations, the familiarity application may estimate driver familiarity with a vehicle operation based on a predefined set of thresholds. For example, the task tracker may perform a vehicle operation. The familiarity application may retrieve familiarity data describing the driver's familiarity with the given vehicle operation. The familiarity application may estimate the driver's familiarity with the given vehicle operation based on one or more of the following: (1) the familiarity data; (2) a predefined set of thresholds including an incremental scale; and (3) the occurrence count for the vehicle operation data.

In some implementations, the familiarity application may retrieve a template explanation for the given vehicle operation. The familiarity application may adapt the template explanation based on the estimate of the driver's familiarity with the given vehicle operation. The template explanation may include a comprehensive explanation of the vehicle operation which may then be adapted or optimized based on the driver's familiarity with the vehicle operation. The familiarity application may determine an explanation of the vehicle operation personalized for the driver based on the adapted template explanation.

Example System Overview

FIG. 1 illustrates a block diagram of one embodiment of system 100 for providing driver familiarity adapted explanations for proactive automated vehicle operations. The system 100 includes a vehicle 123, a weather data server 151, a social network server 155, and a traffic data server 175. In the illustrated embodiment, these entities of the system 100 may be communicatively coupled via a network 105. The system 100 may include other servers or devices not shown in FIG. 1 including, for example, a power service server for providing power usage service (e.g., a billing service) and a map server for providing map data.

The vehicle 123 can be used by way of example. While FIG. 1 illustrates one vehicle 123, the disclosure applies to a system architecture having one or more vehicles 123. Furthermore, although FIG. 1 illustrates one network 105 coupled to the vehicle 123, the weather data server 151, the social network server 155, and the traffic data server 175, in practice one or more networks 105 can be connected to these entities. While FIG. 1 includes one weather data server 151, one social network server 155, and one traffic data server 175, the system 100 could include one or more weather data servers 151, one or more social network servers 155, and one or more traffic data servers 175.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a GPS satellite for providing GPS navigation to the vehicle 123. In some implementations, the network 105 may include a GPS satellite for providing GPS navigation to the vehicle 123. The network 105 may be a mobile data network such as 3G, 4G, LTE, Voice-over-LTE ("VoLTE"), or any other mobile data network or combination of mobile data networks.

The weather data server 151 can be a hardware server that includes a processor, a memory, and network communication capabilities. In the illustrated embodiment, the weather data server 151 is coupled to the network 105 via a signal line 176. The weather data server 151 sends and receives data to and from other entities of the system 100 via the network 105. For example, the weather data server 151 may receive a request for weather data from the vehicle 123. The weather data server 151 transmits the requested data to the vehicle 123 over the network 105.

The weather data server 151 includes a weather application 153 for generating weather data. The weather data may include roadway weather conditions, current forecasts, future forecasts, historical weather, etc. The weather application 153 may generate weather data for a particular location. For example, the weather application 153 may receive a request for weather data from the vehicle 123 that specifies a route that the vehicle 123 is travelling, a zip code, a town, etc. The weather application 153 may determine a weather forecast for the particular location and transmit the weather data to the vehicle 123.

The social network server 155 can be a hardware server that includes a processor, a memory, and network communication capabilities. In the illustrated example, the social network server 155 is coupled to the network 105 via signal line 154. The social network server 155 sends and receives data to and from other entities of the system 100 via the network 105. For example, the social network server 155 may receive a request for social data from the vehicle 123. The social network server 155 transmits the requested data to the vehicle 123 over the network 105.

The social network server 155 includes a social network application 157. The social network application 157 may generate a social network. For example, the social network may include Facebook™, Google+™, LinkedIn™, Tinder™, or QQ™. A social network can include a type of social structure where the users may be connected by a common feature. The common feature may include relationships or connections, such as friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they are related.

In some implementations, the social network application 157 generates a social network that may include social data that the vehicle 123 uses to determine a vehicle task or a driver adapted explanation of the vehicle task. For example, a driver of the vehicle 123 may have a friend on the social network that provides an update about traffic that the social network application 157 transmits to the vehicle 123. In some implementations, the social network application 157 may generate social data that includes vehicle tasks and/or vehicle operations that the social network server 155 transmits to the vehicle 123. For example, the common feature that connects the users in the social network may be that the users all use familiarity application 199. In this example, the social network application 157 may use the social network to crowd source social data that includes one or more template explanations or ways for adapting template explanations.

The traffic data server 175 can be a hardware server that includes a processor, a memory, and network communication capabilities. In the illustrated embodiment, the traffic data server 175 is coupled to the network 105 via a signal line 179. The traffic data server 175 sends and receives data to and from other entities of the system 100 via the network 105. For example, the traffic data server 175 may receive a request for traffic data from the vehicle 123. The traffic data server 175 transmits the requested data to the vehicle 123 over the network 105.

The traffic data server 175 may include a traffic application 177 for generating traffic data. For example, the traffic application 177 may generate traffic data that describes traffic conditions. The traffic application 177 may receive a request for traffic data along a route that the vehicle 123 is travelling. The vehicle 123 may request the traffic data once, periodically (e.g., every five minutes, every ten minutes, etc.), or in response to a change in the traffic conditions.

The vehicle 123 may include an automobile, a bus, an airplane, a boat, or other vehicular conveyance. The vehicle 123 may be an electric, hybrid or include an internal combustion engine. In some implementations, the vehicle 123 may include an autonomous vehicle or a semi-autonomous vehicle 123. In some implementations, the vehicle 123 may include a semi-autonomous vehicle 123 in which the vehicle 123 controls at least part of the steering functionality of the vehicle 123.

In some implementations, the vehicle 123 may include an onboard vehicle computer including a memory and a processor. In the illustrated example, the vehicle 123 is communicatively coupled to the network 105 via signal line 118.

The vehicle 123 may include one or more of the following: a control element 178; a speaker 180; a sensor set 182; a task tracker 191; and a familiarity application 199.

The control element 178 may include a button, knob, switch or touchscreen which may be selected by a driver of the vehicle 123. The driver may select the control element 178 to engage vehicle operation. For example, the driver may turn a knob to engage the windshield wipers.

Figure 4:
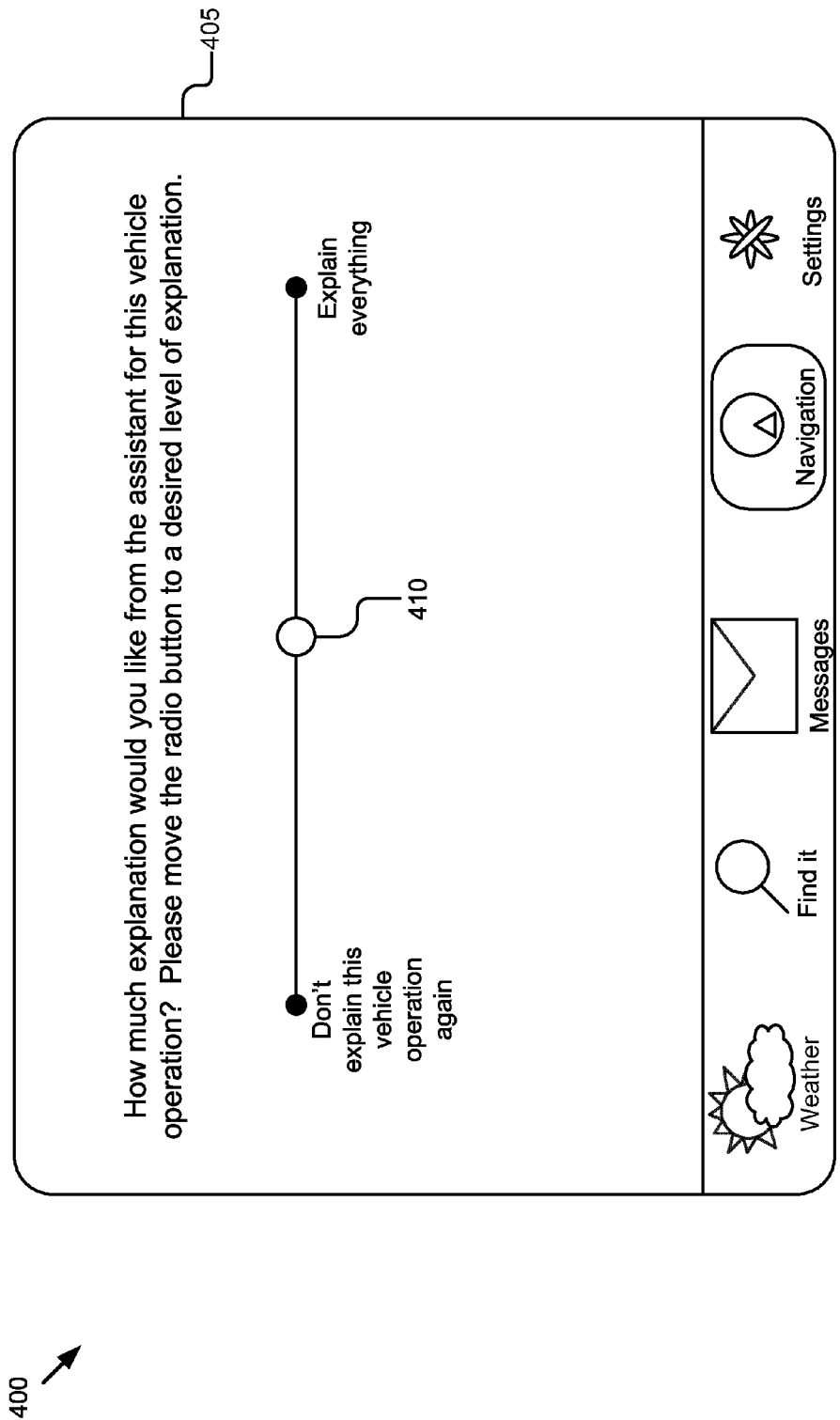
FIG. 4 is a graphic representation of an example user interface for specifying a level of explanation.

In some implementations, the driver of the vehicle 123 may select the control element 178 to indicate that the driver is familiar with a vehicle operation. In some implementations, the control element 178 may be used to dial in how proactive the task tracker 191 performs vehicle operations. In some implementations, the control element 178 may be used to dial in the degree of explanation that the familiarity application 199 provides to the driver. An example of the control element 178 as a touchscreen is depicted in FIG. 4.

The speaker 180 may include an audio reproduction device configured to reproduce audio files. The audio files may include audible explanations of one or more vehicle operations. The speaker 180 may include one or more dynamic, orthodynamic or static speakers mounted in various locations of the interior of the vehicle 123.

The sensor set 182 may include one or more devices that provide sensor data about a vehicle operation or a user reaction. For example, the sensor set 182 may include one or more in-vehicle sensors that monitor and track the initiation or completion of different vehicle operations. The sensor set 182 may be communicatively coupled to an onboard computer of a vehicle so that the sensors included in the sensor set 182 may be monitored and controlled by the task tracker 191 and the familiarity application 199.

The sensors included in the sensor set 182 may include one or more internal sensors configured to detect and store sensor data. The internal sensors may include one or more of the following: one or more in-vehicle cameras; one or more heart rate monitors; one or more carbon monoxide sensors; one or more perspiration sensors; one or more microphones; one or more pressure sensors; and any other sensors that may describe the actions of the driver and the driver's familiarity with one or more vehicle operations.

In addition to internal sensors, the sensor set 182 may include external sensors such as one or more of the following: a camera or camera array mounted to the exterior of the vehicle 123, a microphone; a moisture sensor, a thermometer; an altimeter; an accelerometer; a WiFi sniffer; a Bluetooth antenna; a LIDAR camera; a humidistat; and an infrared camera.

As described above, the sensor set 182 may include an in-vehicle camera. The in-vehicle camera may be mounted to view the driver. In particular, the in-vehicle camera may be mounted to view the driver's face or eyes. The sensor set 182 may include software for monitoring the driver's facial expressions, eye gaze or pupil dilation and generating sensor data based on this information. The in-vehicle camera may transmit the sensor data to the onboard computer of the vehicle 123 where it may be monitored by the task tracker 191 or the familiarity application 199. In some implementations where multiple in-vehicle cameras are used, the in-vehicle cameras may be positioned to capture different angles of the driver or the driver's facial expressions.

The sensor set 182 may include an infrared detector, a motion detector, a thermostat, etc. Alternatively or additionally, the sensor set 182 may include a component or module of another system or device included in the vehicle 123 (e.g., radio, infotainment system, air conditioner, windshield wipers, systems for repositioning vehicle occupant seats, systems for changing the level of vehicle windows, vehicle headlights, vehicle cabin lights, etc.) that reports a status of the system or device to the onboard computer of the vehicle 123 where it may be monitored or controlled by the task tracker 191 or the familiarity application 199. For example, if the driver turns on the windshield wipers or changes the speed of the windshield wipers, the windshield wiper system may report this event to the onboard computer of the vehicle 123.

Accordingly, the sensor set 182 may provide sensor data describing one or more of the following: a temperature inside the vehicle; a temperature outside the vehicle; a position of the seats; a radio station; an audio program; a window level; a level of illumination of vehicle headlights or cabin lights, a speed of windshield wipers, and other parameters or settings associated with the vehicle and/or any system, subsystem, or device included in or communicatively coupled to the vehicle.

In some implementations, the sensor set 182 may include hardware for performing location detection. The location detection may be provided by a global positioning system (GPS) or location detection through triangulation via a wireless network.

In some implementations, the sensor set 182 may include sensors for measuring one or more of a current time, a location (e.g., a latitude, longitude, and altitude of a location), an acceleration of the vehicle 123, a velocity of the vehicle 123, a fuel tank level of the vehicle 123, a battery level of the vehicle 123, etc.

As described above, the sensor set 182 may also include one or more microphones. The microphones may monitor and record the vocalizations of the driver. The microphones may include software for analyzing the recorded audio and isolating the vocalizations of the driver among other noises included in the recorded audio. The microphones may be configured so that they may be turned off to protect the privacy of the driver. In some implementations, the microphones are configured so that they only record audio when the driver first speaks a keyword. For example, the driver states the keyword "Toyota" and then the microphone records audio for a predetermined period of time or until the driver stops speaking.

The task tracker 191 may include code and routines configured to monitor the sensor set 182 for sensor data, determine a vehicle task from a digitally stored dataset based on the sensor data, determine a next vehicle operation to autocomplete based on the vehicle task, and autocomplete the next vehicle operation. The digitally stored dataset is discussed below with reference to element 281 of FIG. 2.

In some implementations, the task tracker 191 determines an occurrence of an initial vehicle operation performed by a driver based on the sensor data from the sensor set 182. The task tracker 191 may directly determine the initial vehicle operation performed by the driver, such as when a driver presses a button on a stereo system. Alternatively, the task tracker 191 may indirectly determine the initial vehicle operation performed by the driver, such as by receiving images from an in-vehicle sensor of the sensor set 182 and determining whether the driver's movement corresponds to pressing the button on the stereo system.

The task tracker 191 may determine a confidence factor that indicates a likelihood that the initial vehicle operation performed by the driver was properly determined. For example, the task tracker 191 may have difficulty discerning whether the driver turned on the windshield wipers or turned on the windshield wiper spray when both functions are activated using the same switch. The task tracker 191 may determine the vehicle task based on the confidence factor exceeding a threshold value. For example, the task tracker 191 may set the threshold value at 50% and the confidence factor has to exceed 50% in order for the vehicle task to be determined.

The task tracker 191 may determine the occurrence of the initial vehicle operation performed by a driver regardless of a parameter associated with the initial vehicle operation. For example, the task tracker 191 may determine that the driver turned on the air conditioning regardless of whether the driver sets the temperature to 80 degrees Fahrenheit or 75 degrees Fahrenheit. Similarly, the task tracker 191 may accommodate operation parameters and sensor parameters.

In some implementations, the task tracker 191 determines the vehicle task based on sensor data independent of driver action. In some implementations, the task tracker 191 may monitor the sensor set 182 for sensor data from exterior vehicle sensors. For example, the task tracker 191 determines from the sensor data that it is raining. The task tracker 191 determines the vehicle task based on the sensor data from the exterior vehicle sensors included in the sensor set 182. For example, the task tracker 191 determines that the vehicle task is preparing the vehicle for driving in the rain. The task tracker 191 determines from a digitally stored dataset that a first operation is to turn on the windshield wipers and that a second vehicle operation is to turn on the headlights.

In some implementations, the task tracker 191 receives data from the network 105. For example, the task tracker 191 may receive weather data from the weather data server 151 or traffic data from the traffic data server 175 via the network 105 and uses the weather data or the traffic data to determine the vehicle task from the digitally stored dataset. For example, the task tracker 191 may receive traffic data indicating that the driving directions that are being displayed on a display in the vehicle 123 include a route that intersects a huge traffic jam. The task tracker 191 may determine that the vehicle task is to avoid a traffic jam. The task tracker 191 may determine that a first vehicle operation is automatically updating the driving directions to avoid the traffic jam and that a second vehicle operation is to retrieve a number for the driver's spouse from an address book and to call the number.

The task tracker 191 may learn from a driver that performs vehicle operations to determine vehicle tasks that are stored in a digitally stored dataset. Before the digitally stored dataset is created, the task tracker 191 may monitor a sequence of vehicle operations performed by the driver to complete a vehicle task. The monitoring may include determining parameters associated with each operation and a count of the vehicle operations performed. For example, the driver may start the vehicle, move a vehicle seat to a different position, and set the stereo to a particular radio station. The task tracker 191 may determine that these three vehicle operations are performed to complete an initial start vehicle task. The task tracker 191 may generate the digitally stored table by adding the vehicle task with the sequence of vehicle operations performed by the driver and parameter values associated with the vehicle seat position and the radio station.

The task tracker 191 may update the digitally stored table based on driver feedback. For example, the task tracker 191 may determine an occurrence of a subsequent vehicle operation performed by a driver in response to autocompleting the vehicle task. For example, in response to the task tracker 191 turning on the heated seats, the driver may have a habit of turning down the heat. The task tracker 191 may update the digitally stored table by adding the subsequent vehicle operation to the vehicle task as an additional operation to be autocompleted. In some implementations, the task tracker 191 may add the subsequent vehicle operation based on a threshold number of times that the driver performs the subsequent vehicle operation after the task tracker 191 autocompletes the other vehicle operations for the vehicle task. For example, the task tracker 191 may add turning down the heat as a subsequent vehicle operation to be performed for the vehicle task if the driver turned down the heat at least five times after the task tracker 191 turned on the heated seats.

The task tracker 191 may modify a level of autocomplete. In some implementations, the task tracker 191 may generate a driver interface that displays graphical elements for a driver to modify the level of autocomplete. For example, the task tracker 191 may generate a driver interface with a movable slide for selecting the level of autocomplete, radio buttons for selecting a level of autocomplete, a drop-down box with the level of autocomplete, etc. The level of autocomplete may include a range from no autocomplete to all autocomplete. No autocomplete may include all vehicle operations being performed manually by a driver. All autocomplete may include no manual steps from the driver such that the vehicle task is determined only from sensor data and not from the driver performing an initial vehicle operation. Gradations in between no autocomplete and all autocomplete may include, for example, a driver performing an initial vehicle operation and the task tracker 191 performing next vehicle operations associated with the vehicle task. Once a driver selects the level of autocomplete, the task tracker 191 may update the digitally stored dataset to include the level of autocomplete.

The familiarity application 199 may include code and routines configured to provide driver familiarity adapted explanations for proactive automated vehicle operations.

The familiarity application 199 may provide an explanation of the vehicle operation to the driver. For example, responsive to the task tracker 191 autocompleting or beginning to autocomplete a vehicle operation, the familiarity application 199 may monitor the sensor set 182 for sensor data that captures images, sounds, pressure, or other physical changes of the driver. For example, the familiarity application 199 may receive images of the driver's face and may determine that the driver frowned, the driver's pupils dilated, the driver spoke words, such as "okay," "what," or uttered expletives or other words or phrases indicating the driver's level of familiarity with a vehicle operation. The familiarity application 199 may include a list of words that have a particular meaning. For example, the word "okay" may indicate that the driver is familiar with the vehicle operation whereas the word "what" may indicate that the driver is not familiar with the vehicle operation. In another example, the in-vehicle sensors 197 may sense that the driver grips the steering wheel or starts sweating in response to the task tracker 191 autocompleting the vehicle operation.

The familiarity application 199 may generate a familiarity estimate that indicates whether the driver is familiar with the next vehicle operation based on the sensor data. For example, the familiarity application 199 may determine a familiarity estimate that indicates that the driver understands the vehicle operation when the driver says "okay." Conversely, the familiarity application 199 may determine a familiarity estimate that indicates that the driver is confused if the driver says "What?" If the familiarity estimate fails to exceed a threshold value, the familiarity application 199 may generate an explanation of the vehicle operation for the driver.

In some implementations, the familiarity application 199 estimates, substantially contemporaneous to the task tracker's 191 performance of a proactive automated vehicle operation, the driver's familiarity with that vehicle operation and presents an explanation to the driver of the vehicle 123. For example, if the task tracker 191 proactively autocompletes a vehicle operation for the driver, then the familiarity application 199 may (1) estimate whether the driver is familiar with the vehicle operation and (2) present an explanation of the vehicle operation to the driver. If the driver is estimated to be familiar with the vehicle operation by the familiarity application 199, then the familiarity application 199 may not present an explanation of the vehicle operation to the driver.

The familiarity application 199 may estimate the driver's familiarity with a vehicle operation the first time that operation is performed by the task tracker. For example, the familiarity application 199 may establish a familiarity estimate the first time that a proactive automated vehicle operation occurs and upon every subsequent occurrence of that same proactive automated vehicle operation. In some implementations, the first time a vehicle operation is performed by the task tracker 191, a predefined table of familiarity estimates for different automated proactive vehicle operations (i.e., the "familiarity estimate table" described below with reference to element 214 of FIG. 2) may be used to determine familiarity data describing an estimate of the driver's familiarity with the particular vehicle operation. The familiarity data is described in more detail below with reference to element 212 of FIG. 2.

In another embodiment, the first estimate of driver familiarity may be established and tracked by the familiarity application 199 based on sensor data describing sensor observations of the driver. For example, the sensors may include one or more in-vehicle cameras and microphones to monitor the driver's facial expressions, eye gaze, pupil dilation and vocalizations which may indicate whether the driver understands a proactive automatic vehicle operation.

In some implementations, the familiarity application 199 may include an electronic device configured to perform one or more steps of the method 300 described below with reference to FIGS. 3A-3C. The familiarity application 199 will be described in more detail below.

In some implementations, the familiarity application 199 or the task tracker 191 can be implemented using hardware including a field-programmable gate array ("FPGA") or an application-specific integrated circuit ("ASIC"). In some other implementations, the familiarity application 199 or the task tracker 191 can be implemented using a combination of hardware and software. The familiarity application 199 or the task tracker 191 may be stored in a combination of the devices and servers, or in one of the devices or servers. The familiarity application 199 or the task tracker 191 may include code and routines configured to perform one or more steps of the method 300 described below with reference to FIGS. 3A-3C when executed by a processor, such as processor 225, described below with reference to FIG. 2.

Example Electronic Devices

Figure 2:
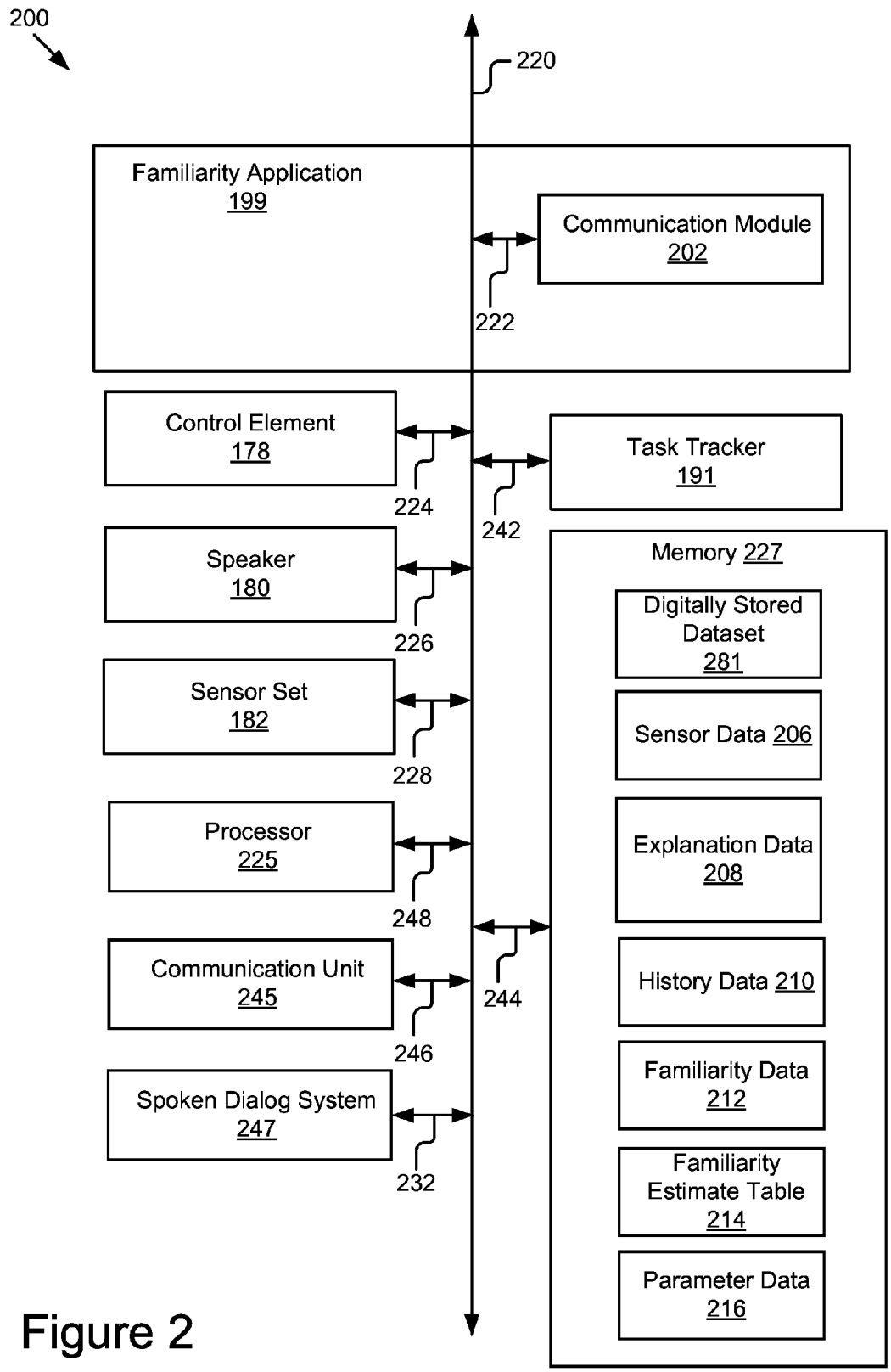
FIG. 2 is a block diagram illustrating an example familiarity system for providing driver familiarity adapted explanations for proactive automated vehicle operations.

FIG. 2 is a block diagram illustrating an example familiarity system 200 for providing driver familiarity adapted explanations for proactive automated vehicle operations. The proactive automated vehicle operations may include those operations performed by the task tracker 191. The familiarity application may determine the driver's familiarity with the vehicle operation performed by the task tracker 191 and provide the driver familiarity adapted explanation of the vehicle operation performed by the task tracker 191.

The familiarity system 200 may be an element of an onboard computer of the vehicle 123. In some implementations, the familiarity system 200 may include a special-purpose computing device configured to provide some or all of the functionality described below with reference to method 300 of FIGS. 3A-3C.

The familiarity system 200 may include the familiarity application 197, the task tracker 191, a processor 225, a memory 227, the control element 178, the speaker 180, the sensor set 182, a communication unit 245 and a spoken dialog system 247. The components of the familiarity system 200 are communicatively coupled by a bus 220.

The task tracker 191, control element 178, speaker 180 and sensor set 182 were described above with reference to FIG. 1, and so, these descriptions will not be repeated here. The task tracker 191 is communicatively coupled to the bus 220 via signal line 242. The control element 178 is communicatively coupled to the bus 220 via signal line 224. The speaker 180 is communicatively coupled to the bus 220 via signal line 226. The speaker set 182 is communicatively coupled to the bus 220 via signal line 228.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. The processor 225 may include a graphical processing unit. Other processors, operating systems, sensors, displays, and physical configurations may be possible. The processor 225 is coupled to the bus 220 for communication with the other components via signal line 248.

The memory 227 is a tangible storage medium that stores instructions or data that may be executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 244.

As illustrated in FIG. 2, the memory 227 stores a digitally stored dataset 281, sensor data 206, explanation data 208, history data 210, familiarity data 212, a familiarity estimate table 214 and parameter data 216.

The digitally stored dataset 281 includes a countable sequence of vehicle operations that are performed as a group in order to complete a vehicle task. The digitally stored dataset 281 describes different vehicle tasks and the vehicle operations that need to be autocompleted to complete each vehicle task. For each vehicle operation in the vehicle task, the digitally stored dataset 281 may contain a task initiation detection template that includes sensor values that suggest that the vehicle task is initiated. For example, if the driver sets the windshield wipers to a low speed, the task tracker 191 may determine that the vehicle operation is to prepare the vehicle 123 of FIG. 1 to drive in the rain. In some implementations, the digitally stored dataset 281 includes a table that includes vehicle tasks and vehicle operations associated with each vehicle task.

One or more vehicle tasks may be associated with a subset of the available sensor set 182 to be monitored to determine whether a vehicle task or a vehicle operation has been initiated or completed. As a result, the task situation detection template includes different sensors that are monitored for each task to reduce the number of sensors that are monitored. As a result, for each vehicle task, the task tracker 191 monitors the sensors of the sensor set 182 that are listed in the digitally stored dataset 281 as being associated with the vehicle task.

The sensor data 206 may include the data measured and recorded by the sensors included in the sensor set 182. The digitally stored dataset 281 may include a task situation detection template for instances where the vehicle operation is performed based on the sensor data 206. The task situation detection template may describe when the user is likely to perform the vehicle tasks and, if the sensor data 206 indicates that the situation is occurring, the task tracker performs two or more vehicle tasks.

In some implementations, the digitally stored dataset 281 includes sensor data 206 organized into blocks of the memory 227 designated as temporally separated. For each temporally separated memory block, the task tracker 191 detects the performance of a vehicle operation that denotes the user performing the vehicle operation based on data describing a connection between which vehicle operations use which sensors. Alternatively, the task tracker 191 may use the task situation detection template to detect a trigger for determining an occurrence of an initial vehicle operation. For a sequence of vehicle operations (including no operation) performed over the different temporally separated memory blocks, the task tracker 191 may identify from a digitally stored list of tasks a vehicle task that denotes that the user has performed the task using predefined data that includes a sequence of vehicle operations that are common or expected for that particular vehicle task.

The explanation data 208 includes a description of the vehicle operations. In some implementations, the explanation data 208 include one or more template explanations for each vehicle operation. The familiarity application 197 may adapt the template explanation based on the estimate of the driver's familiarity with the given vehicle operation. The template explanation may include a comprehensive explanation of the vehicle operation which may then be adapted or optimized by the familiarity application 197 based on the driver's familiarity with the vehicle operation. The familiarity application 197 may determine an explanation of the vehicle operation personalized for the driver based on the adapted template explanation and the driver's estimated familiarity with the vehicle operation performed by the task tracker 191.

In some implementations, the explanation data 208 may include graphical data for providing a graphical display depicting the driver familiarity adapted explanation of the vehicle operation performed by the task tracker 191.

In some implementations, the explanation data 208 may include audio data for providing an audio-version of the driver familiarity adapted explanation of the vehicle operation performed by the task tracker 191. The audio-version of the driver familiarity adapted explanation may be provided through the speaker 180 of the familiarity system 200.

The history data 210 includes data, for each vehicle operation, describing the number of instances a particular driver has been present for a particular vehicle operation or received an explanation from the familiarity application 197. The history data 210 for a given vehicle operation may be updated by the familiarity application 197 or the task tracker 191 after each instance when the task tracker 191 performs the vehicle operation or the familiarity application 199 provides an explanation of the vehicle operation.

The familiarity data 212 may describe an estimate of the driver's familiarity with different vehicle operations. The familiarity application 199 may generate the familiarity data 212. The familiarity data 212 may be initially generated based on the research and experience indicating how familiar drivers typically are regarding a given vehicle operation. The familiarity application 199 may modify the familiarity data 212 after the first instance of the task tracker 191 performing the vehicle operation. For example, the familiarity application 199 may modify the familiarity data 212 based on sensor data 206 indicating that the driver was confused by the vehicle operation or comfortable with the vehicle operation. The familiarity application 199 may also update the familiarity data 212 based on the instance count described by the history data 210. In some implementations, the familiarity application 199 may update the familiarity data 212 based on a combination of the history data 210 and the sensor data 206.

The familiarity application 199 may modify the explanations described by the explanation data 208 for subsequent performance of a vehicle operation by the task tracker 191 based on the familiarity data 212 describing the driver's estimated familiarity with that particular vehicle operation. In this way, the familiarity application 199 may avoid providing the driver with redundant explanations for vehicle operations when the driver is estimated to be familiar with performance of the vehicle operation by the task tracker 191.

In some implementations, the familiarity data 212 is an element of the familiarity estimate table 214.

The familiarity estimate table 214 may describe one or more of the following: (1) one or more tasks that may be performed by the task tracker 191; (2) the vehicle operations that are included in each task; (3) an estimate of how familiar the driver is with each of the one or more vehicle operations (including an initial estimate of the driver's familiarity with the vehicle operation on first use); and (4) an estimate, for each vehicle operation included in the familiarity estimate table 214, of the degree of detail that should be included in the explanation provided by the familiarity application substantially contemporaneous to the task tracker 191 proactively and automatically performing this vehicle operation.

The familiarity estimate table 214 may be used to estimate the driver's initial familiarity with a given vehicle operation. For example, assume that a task includes "turning on the vehicle's hazard lights when the tire is flat or vehicle is out of fuel." Further assume that this is the first time that this task has been performed for the driver, or that the driver has never used the hazard lights for their vehicle 123 (which, in this example, is a vehicle operation included in the task). Since this is the first time that this vehicle operation has been performed for the driver, the familiarity estimate table 214 may include familiarity data 212 indicating that the driver is not familiar with the vehicle operation of turning on the vehicle's hazard lights. Moreover, since research and experience shows that drivers infrequently use their hazard lights, the familiarity estimate table 214 may include data indicating that the explanation provided by the familiarity application 199 in the first instance of the task tracker 191 performing this vehicle operation may include more detail than explanations for other vehicle operations which are estimated to be more familiar to the driver.

By comparison, assume instead that the task listed in the familiarity estimate table 214 includes "turning the headlights on when the vehicle is in a dark environment." In this case, since research and experience indicates that drivers frequently use their vehicle headlights, the familiarity estimate table 214 may include familiarity data 212 indicating that the driver is estimated to be familiar with the vehicle operation of turning one the vehicle headlights regardless of whether the driver has not used this vehicle operation in this particular vehicle 123. Accordingly, the familiarity estimate table 214 may also include data indicating that the familiarity application 199 does not need to provide the driver with an explanation of this vehicle operation or, alternatively, that any explanation provided should include less detail than explanations for other vehicle operations which are estimated to be less familiar to the driver.

The parameter data 216 may include data describing a vehicle state at the time that the vehicle operation was last performed. For example, assume the task is "lowering a window to release hot air from the vehicle cabin" and the vehicle operation is lowering a vehicle window. The parameter data 216 may describe the window level during the explanation of the vehicle operation to the driver.

The communication unit 245 may include hardware that transmits and receives data to and from the network 105. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The spoken dialog system 247 may include hardware and software for enabling the familiarity system to communicate with the driver of the vehicle 123. The spoken dialog system 247 is communicatively coupled to the bus 220 via signal line 232.

In some implementations, the familiarity application 197 includes a communication module 202. The communication module 202 is communicatively coupled to the bus 220 via signal line 222. The communication module 202 may include code and routines configured to handle communications between the familiarity application 197 and other components of the familiarity system 200. In some implementations, the communication module 202 can include a set of instructions executable by the processor 225 to provide the functionality described below for handling communications between the familiarity application 197 and other components of the familiarity system 200. In some implementations, the communication module 202 can be stored in the memory 227 of the familiarity system 200 and can be accessible and executable by the processor 225.

The communication module 202 sends and receives data, via the communication unit 245, to and from the network 105. For example, the communication module 202 receives, via the communication unit 245, weather data or traffic data from the network 105.

In some implementations, the communication module 202 receives data from components of the familiarity system 200 and stores the data in the memory 227. For example, the communication module 202 receives sensor data 206 from the sensor set 182 and stores it in the memory 227.

Example Methods

Figure 3A:
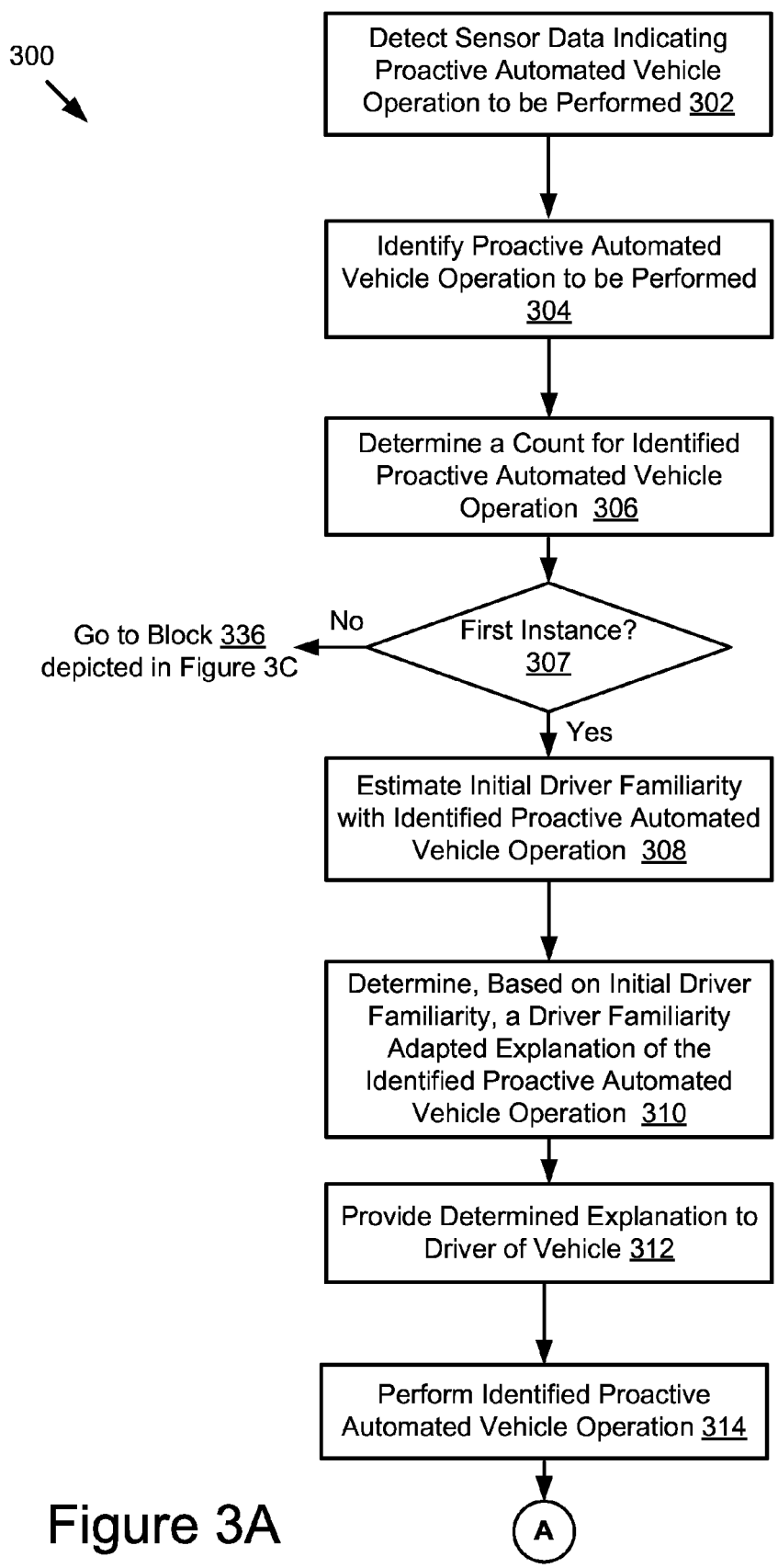
FIGS. 3A-3C is a flowchart of an example method for providing driver familiarity adapted explanations for proactive automated vehicle operations.
Figure 3B:
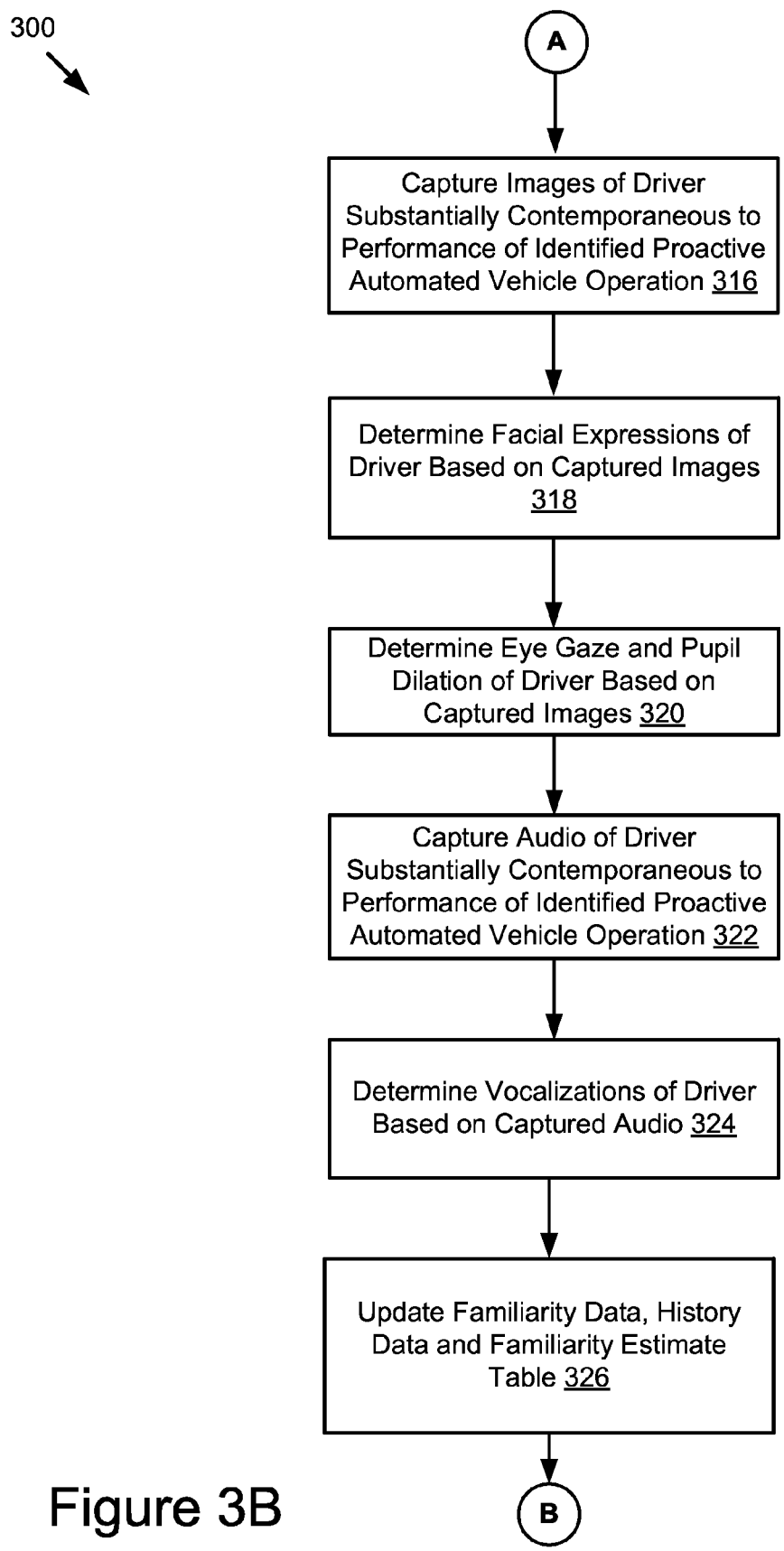
Figure 3C:
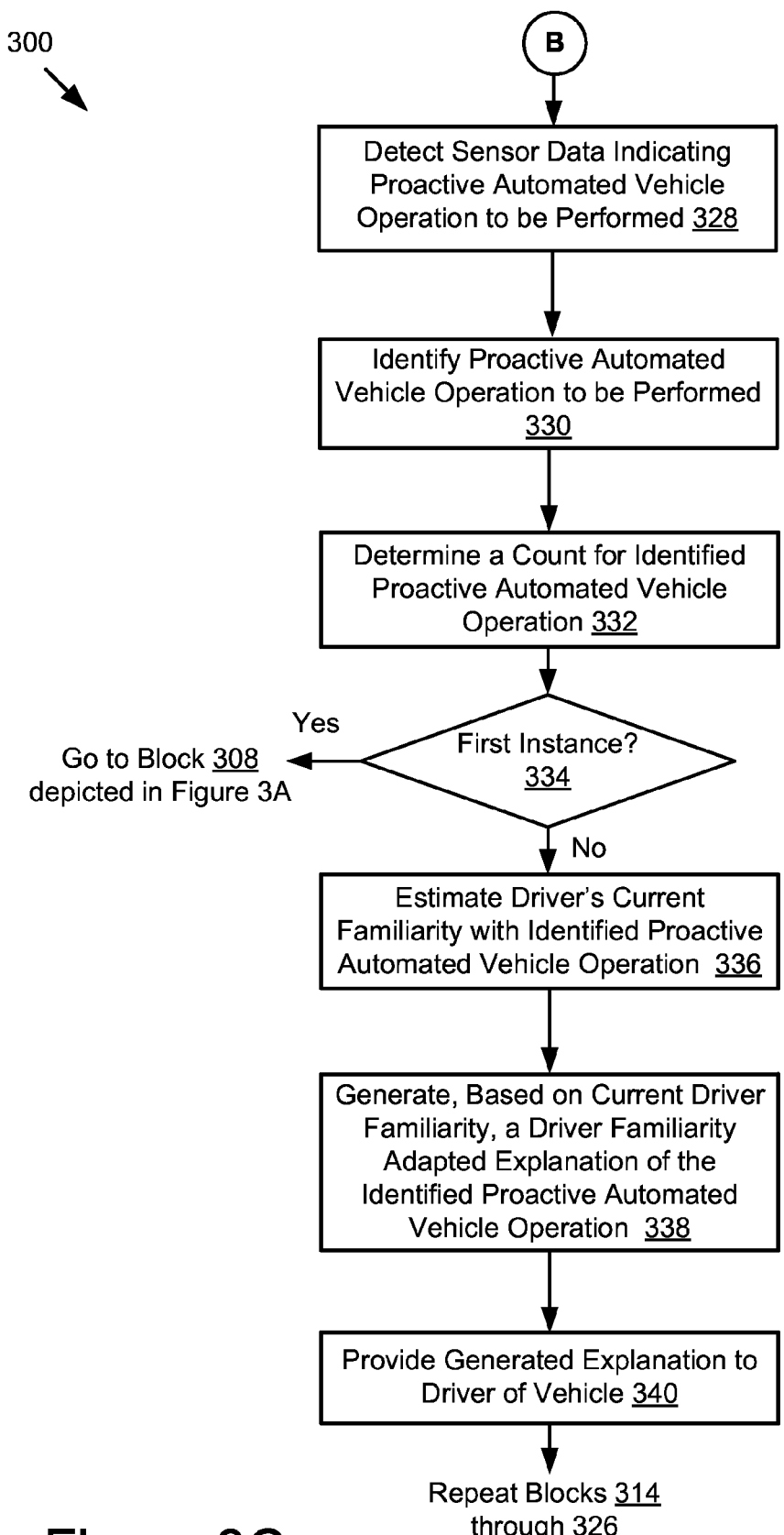

FIGS. 3A-3C is a flowchart of an example method 300 for providing driver familiarity adapted explanations for proactive automated vehicle operations. In some implementations, one or more blocks of the method 300 may be performed by the familiarity system 200 described above with reference to FIG. 2.

Turning now to FIG. 3A. At block 302, sensor data 206 may be detected. The sensor data 206 may indicate a proactive automated vehicle operation to be performed by the task tracker 191. At block 304, the proactive automated vehicle operation associated with the sensor data 206 may be identified. For example, the proactive automated vehicle operation maybe identified based on the digitally stored dataset 281. At block 306, a count of the number of times the task tracker 191 has performed the identified proactive automated vehicle operation may be determined. The count may be determined based on the history data 210 for the identified proactive automated vehicle operation.

At block 307, a determination is made regarding whether this is the first instance of the task tracker 191 performing the identified proactive automated vehicle operation. If this is not the first instance, the method 300 proceeds to block 336 described below with reference to FIG. 3C. If this is the first instance, then the method 300 proceeds to block 308.

At block 308, the initial driver familiarity with the identified proactive automated vehicle operation is estimated. The initial driver familiarity with the identified proactive automated vehicle operation may be estimated based on the familiarity data 212 or the familiarity estimate table 214 (which may include the familiarity data 212).

At block 310, a driver familiarity adapted explanation of the identified proactive automated vehicle operation is determined based on the initial driver familiarity. The driver familiarity adapted explanation of the identified proactive automated vehicle operation may be determined based on one or more of the elements stored in the memory 227. In one embodiment, driver familiarity adapted explanation of the identified proactive automated vehicle operation may be determined based on (1) the estimate of the initial driver familiarity with the identified proactive automated vehicle operation and (2) a template explanation for the vehicle operation. The template explanation may be select from one or more template explanations for the vehicle operation.

At block 312, the determined explanation is provided to the driver of the vehicle 123. For example, the driver familiarity adapted explanation of the identified proactive automated vehicle operation may be provided via one or more of the following: an in-vehicle display, the speaker 180; and the spoken dialog system 247.

At block 314, the task tracker 191 may perform the identified proactive automated vehicle function. For example, the onboard computer of the vehicle 123 may include the functionality to digitally control the state of one or more vehicle operations. The task tracker 191 may cause the onboard computer of the vehicle 123 to change the state of one or more vehicle operations, thereby proactively autocompleting a task for the driver of the vehicle 123.

Turning now to FIG. 3B. At block 316, the familiarity application 199 may cause the sensor set 182 to capture images of the driver. For example, the sensor set may include one or more in-vehicle cameras that may capture one or more images of the driver. The one or more in-vehicle cameras may be communicatively coupled to the onboard computer of the vehicle 123 so that they may be controlled by the onboard computer. The familiarity application 199, which is an element of the onboard computer or capable of controller performance of the onboard computer, may cause the one or more in-vehicle cameras to capture one or more images of the driver. The images of the driver may be captured substantially contemporaneous to performance of the identified proactive automated vehicle operation.

At block 318, the familiarity application 199 may determine one or more facial expressions of the driver based on the captured images of the driver. For example, the familiarity application 199 may include code and routines configured to analyze an image and determine the pixels in the image corresponding to facial expression of the driver.

At block 320, the familiarity application 199 may determine one or more of the eye gaze or the pupil dilation of the driver based on the captured images of the driver. For example, the familiarity application 199 may include code and routines configured to analyze an image and determine the pixels in the image corresponding to one or more of the eye gaze and the pupil dilation of the driver. The familiarity application 199 may also analyze the image and identify which objects are associated with the driver's eye gaze. For example, the familiarity application 199 may determine that the eye gaze of the driver is associated with a control element for the windshield wipers or some other vehicle operation.

At block 322, the familiarity application 199 may cause the sensor set 182 to capture audio of the driver. For example, the sensor set 182 may include one or more in-vehicle microphones that may capture an audio recording of the driver. The one or more in-vehicle microphones may be communicatively coupled to the onboard computer of the vehicle 123 so that they may be controlled by the onboard computer. The familiarity application 199, which is an element of the onboard computer or capable of controller performance of the onboard computer, may cause the one or more in-vehicle microphones to capture the audio recording of the driver. The audio of the driver may be captured substantially contemporaneous to performance of the identified proactive automated vehicle operation.

At block 324, the familiarity application 199 may determine one or more vocalizations of the driver based on the captured audio of the driver. For example, the familiarity application 199 may include the spoken dialog system 247 or be configured to control performance of the spoken dialog system 247. The spoken dialog system 247 may include code and routines configured to analyze the audio recording and determine which portions of the audio recording correspond to the driver, what words are being spoken by the driver and the meaning of these words.

At block 326, the familiarity application 199 may determine whether the driver is familiar with the identified proactive automated vehicle operation performed at block 314 based on one or more of the following: one or more facial expressions of the driver; the eye gaze of the driver; the pupil dilation of the driver; the vocalizations of the driver; and any other sensor data 206 indicating the driver's familiarity with the identified proactive automated vehicle operation performed at block 314.

At block 326, the familiarity application 199 may also update the history data 210 or the familiarity estimate table 214 to indicate the first instance of the task tracker 191 performing the identified proactive automated vehicle operation.

Turning now to FIG. 3C. At block 328, sensor data 206 is detected. The sensor data 206 may indicate a proactive automated vehicle operation to be performed by the task tracker 191. At block 330, the proactive automated vehicle operation associated with the detected sensor data 206 may be identified. At block 332, a count of the number of times the task tracker 191 has performed the identified proactive automated vehicle operation may be determined.

At block 334, a determination is made regarding whether this is the first instance of the task tracker 191 performing the identified proactive automated vehicle operation. If this is the first instance, the method 300 proceeds to block 308 described above with reference to FIG. 3A. If this is not the first instance, then the method 300 proceeds to block 336.

At block 336, the familiarity application 199 may estimate the driver's current familiarity with the identified proactive automated vehicle operation. The driver's familiarity with the identified proactive automated vehicle operation may be determined based on one or more of elements stored in the memory 227. In some implementations, the driver's familiarity with the identified proactive automated vehicle operation may be determined based on one or more: familiarity data 212 associated with the identified proactive automated vehicle operation; history data 210 describing a count of the number of times the task tracker 191 has performed the identified proactive automated vehicle operation; sensor data 206 describing the driver, weather or traffic conditions.

In some implementations, the driver's current familiarity with the identified proactive automated vehicle operation may be determined based in part on real time or near real time sensor data 206 which is collected substantially contemporaneous to performance of the identified proactive automated vehicle operation by the task tracker 191. For example, the driver's familiarity with the identified proactive automated vehicle operation may be determined based on one or more of the following: one or more facial expressions of the driver; the eye gaze of the driver; the pupil dilation of the driver; the vocalizations of the driver; and any other sensor data 206 indicating the driver's familiarity with the proactive automated vehicle operation identified at block 330.

The familiarity application 199 may determine that the driver's current familiarity with the identified proactive automated vehicle operation may differ from the familiarity that may otherwise be indicated by the familiarity data 212 associated with the identified proactive automated vehicle operation or the history data 210 describing the count of the number of times the task tracker 191 has performed the identified proactive automated vehicle operation. For example, the sensor data 206 may indicate that the driver is not familiar with the identified proactive automated vehicle operation even though the driver was familiar with the identified proactive automated vehicle operation on a prior occasion. In this case, the familiarity application 199 may determine that the driver is not currently familiar with the identified proactive automated vehicle operation based on the sensor data 206. In this way, the familiarity application 199 solves the problem of drivers becoming familiar with a proactive automated vehicle operation but later forgetting about it or become less familiar with it.

At block 338, the familiarity application 199 may generate, based on the driver's current familiarity determined in block 336, a driver familiarity adapted explanation of the identified proactive automated vehicle operation.

In some implementations, the driver familiarity adapted explanation of the identified proactive automated vehicle operation is generated based on a template explanation associated with the vehicle operation identified at block 330. The template explanation may include the most comprehensive explanation of the identified vehicle operation available in the memory 227. The familiarity application 199 may adapt the template explanation, based on the estimate of how familiar the driver is with the vehicle operation, to generate a driver familiarity adapted explanation describing the autocomplete of the identified vehicle operation in a detail proportionate to the estimate of how familiar the driver is with the identified vehicle operation. For example, in the driver is estimated to be more familiar with the identified vehicle operation, then the template explanation may be simplified by the familiarity application 199 to include less information in proportion to that amount of information that may be beneficial or desirable to a driver who is more familiar with the identified vehicle operation.

At block 340, the familiarity application 199 may provide the explanation to the driver of the vehicle 123. The method 300 may then repeat one or more of bocks 314-326.

Example User Interface

FIG. 4 is a graphic representation 400 of an example user interface 405 for specifying a level of explanation. In this example, the user interface may be displayed on a display that is part of the vehicle 123 of FIG. 1. For example, the user interface may be displayed as an in-dash display. The user interface may be modified for other displays. For example, the user interface may be displayed on a mobile device that is used while the driver is in the vehicle or on a desktop computer where the user may configure the settings for the task tracker 191.

The user interface 405 includes a sliding button 410 for selecting a level of explanation. In this example, the level of explanation ranges from no explanation being provided for a proactive automated vehicle operation (as indicated by the "Don't explain this vehicle operation again" instruction on the left of the slider) to an explanation being provided in maximum detail for a proactive automated vehicle operation (as indicated by the "Explain everything" instruction on the right side of the slider).

The implementations of the specification can also relate to an apparatus for performing the operations described herein. This apparatus may be specially constructed for the required purposes, or it may include a special-purpose computer selectively activated or reconfigured by a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A system of a vehicle comprising:
   a sensor set including one or more sensors configured to measure sensor data describing a task and a driver of the vehicle;
   an onboard vehicle computer including a tangible memory, a processor, a task tracker and a familiarity application, wherein the task tracker and the familiarity application are stored in the tangible memory which is communicatively coupled to the processor;
   wherein the task tracker, responsive to being executed by the processor, causes the processor to determine, based on the sensor data describing the task, a vehicle operation to be proactively performed by the task tracker to autocomplete the task for the driver of the vehicle;
   wherein the familiarity application, responsive to being executed by the processor, causes the processor to:
      estimate how familiar the driver is with the vehicle operation based on the sensor data describing the driver of the vehicle;
      retrieve a template explanation associated with the vehicle operation;
      adapt the template explanation, based on the estimate of how familiar the driver is with the vehicle operation, to generate a driver familiarity adapted explanation describing the autocomplete of the vehicle operation; and
      provide the driver familiarity adapted explanation to the driver.

2. The system of claim 1, wherein the sensor set includes one or more in-vehicle cameras and the sensor data describes an image of the driver.

3. The system of claim 2, wherein the steps further comprise:
   analyzing the image to determine a facial expression of the driver; and
   wherein the estimate of how familiar the driver is with the vehicle operation is based at least in part on the facial expression of the driver.

4. The system of claim 2, wherein the steps further comprise:
   analyzing the image to determine an eye gaze of the driver; and
   wherein the estimate of how familiar the driver is with the vehicle operation is based at least in part on the eye gaze of the driver.

5. The system of claim 2, wherein the steps further comprise:
   analyzing the image to determine a pupil dilation of the driver; and
   wherein the estimate of how familiar the driver is with the vehicle operation is based at least in part on the pupil dilation of the driver.

6. The system of claim 1, wherein the sensor set includes one or more microphones and the sensor data describes one or more vocalizations of the driver.

7. The system of claim 6, wherein the steps further comprise:
   analyzing the one or more vocalizations to determine whether the one or more vocalizations are related to how familiar the driver is with the vehicle operation; and
   wherein the estimate of how familiar the driver is with the vehicle operation is based at least in part on the analysis of the one or more vocalizations.

8. The system of claim 6, wherein the steps further comprise:
   analyzing the one or more vocalizations to determine whether the one or more vocalizations include an express instruction of the driver related to adapting the template explanation; and
   wherein the adaption of the template explanation is based at least in part on the express instruction of the driver.

9. The system of claim 1, wherein the estimate of how familiar the driver is with the vehicle operation is based at least in part on a count of how many times the task tracker has proactively performed the task.

10. The system of claim 1, wherein the estimate of how familiar the driver is with the vehicle operation is based at least in part on a count of how many times the task tracker has proactively performed the vehicle operation.

11. The system of claim 10, wherein the count indicates a first instance of the task tracker proactively performing the vehicle operation and the estimate of how familiar the driver is with the vehicle operation is based on an expected familiarity with the vehicle operation for a typical driver.

12. The system of claim 2, wherein the steps further comprise analyzing the image of the driver to determine an identity of the driver and wherein the estimate of how familiar the driver is with the vehicle operation is based at least in part on a count of how many times the task tracker has performed the autocomplete of the task for the identified driver.

13. The system of claim 2, wherein the steps further comprise analyzing the image of the driver to determine an identity of the driver and wherein the estimate of how familiar the driver is with the vehicle operation is based at least in part on a count of how many times the task tracker has proactively performed the vehicle operation for the identified driver.

14. The system of claim 1, wherein the familiarity application includes two or more template explanations for the vehicle operation and wherein the steps further comprise:
  determining which of the two or more template explanations were not used in a most recent performance of the vehicle operation by the task tracker;
  forming a set of one or more template explanations that were not used in the most recent performance of the vehicle operation by the task tracker; and
  wherein the retrieving step includes retrieving the template explanation from the set of one or more template explanations that were not used in the most recent performance of the vehicle operation by the task tracker.

15. The system of claim 1, wherein the estimating step includes estimating how familiar the driver is with the vehicle operation based on familiarity data describing how familiar the driver is with the vehicle operation based on a past experience of the driver with the vehicle operation.

16. The system of claim 15, wherein the familiarity data indicates that the driver is familiar with the vehicle operation, the sensor data indicates that the driver is not familiar with the vehicle operation, and the estimating step includes determining that the driver is not familiar with the vehicle operation based on the sensor data.

17. The system of claim 16, wherein the sensor data is measured in real time.

18. The system of claim 1, wherein the sensor data is measured substantially contemporaneous to the task tracker performing the vehicle operation.

19. A method comprising:
  measuring, using a sensor set including one or more in-vehicle sensors, sensor data describing a task and a driver of a vehicle;
  estimating how familiar the driver is with a vehicle operation based on the sensor data describing the driver of the vehicle;
  retrieving, from a tangible memory communicatively coupled to a processor, a template explanation associated with the vehicle operation;
  adapting the template explanation using the processor, wherein the adaptation of the template explanation is based on the estimate of how familiar the driver is with the vehicle operation, to generate a driver familiarity adapted explanation describing an autocomplete of the vehicle operation in a detail proportionate to the estimate of how familiar the driver is with the vehicle operation; and
  providing the driver familiarity adapted explanation to the driver.

20. A tangible memory of a mobile device comprising computer code which, when executed by an electronic device, causes the electronic device to perform steps comprising:
  measuring, using a sensor set including one or more in-vehicle sensors, sensor data describing a task and a driver of a vehicle;
  estimating how familiar the driver is with a vehicle operation based on the sensor data describing the driver of the vehicle;
  retrieving, from the tangible memory, a template explanation associated with the vehicle operation;
  adapting the template explanation based on the estimate of how familiar the driver is with the vehicle operation, to generate a driver familiarity adapted explanation describing an autocomplete of the vehicle operation in a detail proportionate to the estimate of how familiar the driver is with the vehicle operation; and
  providing the driver familiarity adapted explanation to the driver.

\* \* \* \* \*